(12) United States Patent
Fujino et al.

(10) Patent No.: US 8,520,281 B2
(45) Date of Patent: Aug. 27, 2013

(54) SCANNING OPTICAL APPARATUS

(75) Inventors: Hitoshi Fujino, Tajimi (JP); Yoshifumi Nakamura, Nagoya (JP); Hiroyuki Ominato, Nagoya (JP); Hiroki Yukawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 387 days.

(21) Appl. No.: 13/072,693

(22) Filed: Mar. 26, 2011

(65) Prior Publication Data

US 2011/0242633 A1 Oct. 6, 2011

(30) Foreign Application Priority Data

Mar. 31, 2010 (JP) ................ 2010-082085

(51) Int. Cl.
*G02B 26/08* (2006.01)
(52) U.S. Cl.
USPC ............ 359/207.2; 359/207.3; 359/207.4; 347/244
(58) Field of Classification Search
USPC ........ 359/204.1, 204.2, 205.1–207.6, 212.1, 359/216.1; 347/235, 243, 244, 250, 258–261
See application file for complete search history.

(56) References Cited

U.S. PATENT DOCUMENTS

| | | | |
|---|---|---|---|
| 5,267,057 A | 11/1993 | Sasada | |
| 6,243,124 B1 | 6/2001 | Ozaki et al. | |
| 6,268,876 B1 | 7/2001 | Ozaki et al. | |
| 6,275,249 B1 | 8/2001 | Ozaki et al. | |
| 6,353,455 B1 | 3/2002 | Ozaki et al. | |
| 8,223,416 B2 * | 7/2012 | Yukawa et al. | 359/204.1 |
| 2006/0268381 A1 * | 11/2006 | Tomioka | 359/204 |
| 2008/0158331 A1 | 7/2008 | Kato | |
| 2012/0188624 A1 * | 7/2012 | Kato | 359/204.1 |

FOREIGN PATENT DOCUMENTS

| | | |
|---|---|---|
| CN | 1573597 A | 2/2005 |
| JP | H08-297256 A | 11/1996 |

OTHER PUBLICATIONS

The State Intellectual Property Office of the People'S Republic of China, Notification of First Office Action for Chinese Patent Application No. 201110083700.8 (counterpart Chinese patent application), issued Dec. 27, 2012.

* cited by examiner

*Primary Examiner* — Frank Font
(74) *Attorney, Agent, or Firm* — Baker Botts L.L.P.

(57) ABSTRACT

In a scanning optical apparatus, a third optical element is configured such that a first optical axis defined as an optical axis of an incident-side lens surface of the third optical element is inclined in a main scanning plane with respect to a normal line extending from a scanning center on a target surface to be scanned and an intersection point between the first optical axis and the incident-side lens surface is shifted with respect to the normal line, and that a second optical axis defined as an optical axis of an emission-side lens surface is inclined in the main scanning plane with respect to the first optical axis and an intersection point between the second optical axis and the emission-side lens surface is shifted with respect to the first optical axis.

3 Claims, 11 Drawing Sheets

FIG. 5

Coefficients expressing shapes of lens surfaces and characteristics

| Used Wavelength | $\lambda$ [nm] | 788 |
|---|---|---|
| F-theta lens Refractive index | N | 1.503 |
| Incident angle to Polygon mirror | $\theta i$ [deg] | 80 |
| From Polygon mirror to F-theta lens | e [mm] | 44.5 |
| F-theta lens Center thickness | d [mm] | 11 |
| From F-theta lens to Target surface | fb [mm] | 133.4 |
| F-theta coefficient | k [mm] | 160.0 |
| Maximum scanning range | [mm] | ±110.0 |
| Polygon mirror Maximum scanning angle | $\theta$max [deg] | 39.4 |
| From Polygon mirror to Natural convergent point | fc [mm] | 414.5 |
| Natural convergent Main F number | Fno | 177.1 |

| First surface (Incident-side lens surface) | | Second surface (Emission-side lens surface) | |
|---|---|---|---|
| $c_y$ | 1.091982.E-02 | $c_y$ | 2.616098.E-03 |
| k | -1.872792.E+01 | k | -4.986581.E+02 |
| $A_4$ | -7.168033.E-07 | $A_4$ | -1.615976.E-06 |
| $A_6$ | 2.120174.E-10 | $A_6$ | 4.758962.E-10 |
| $A_8$ | 1.685882.E-14 | $A_8$ | -1.066620.E-13 |
| $A_{10}$ | -2.266537.E-17 | $A_{10}$ | 1.981337.E-17 |
| $A_{12}$ | 3.757256.E-21 | $A_{12}$ | -2.152465.E-21 |
| 1/r | -4.559678.E-02 | 1/r | -8.228317.E-02 |
| $B_2$ | 3.410302.E-04 | $B_2$ | 1.737527.E-04 |
| $B_4$ | 5.068271.E-07 | $B_4$ | -3.054069.E-08 |
| $B_6$ | -1.152162.E-09 | $B_6$ | -1.206831.E-10 |
| $B_8$ | 9.845056.E-13 | $B_8$ | 9.826571.E-14 |
| $B_{10}$ | -3.857809.E-16 | $B_{10}$ | -2.809160.E-17 |
| $B_{12}$ | 5.628748.E-20 | $B_{12}$ | 2.180667.E-21 |

| Lens shift amount | D1 [mm] | 0.58 |
|---|---|---|
| Lens tilt amount | $\beta 1$ [deg] | 0.2 |
| Lens surface shift amount | D2 [mm] | 0.062 |
| Lens surface tilt amount | $\beta 2$ [deg] | 0.39 |

CHANGE IN Fno. IN SUB-SCANNING DIRECTION

FIG. 11

Coefficients expressing shapes of lens surfaces and characteristics

| Used Wavelength | λ [nm] | 788 |
|---|---|---|
| F-theta lens Refractive index | N | 1.503 |
| Incident angle to Polygon mirror | θi [deg] | 80 |
| From Polygon mirror to F-theta lens | e [mm] | 44.5 |
| F-theta lens Center thickness | d [mm] | 11 |
| From F-theta lens to Target surface | fb [mm] | 133.4 |
| F-theta coefficient | k [mm] | 160.0 |
| Maximum scanning range | [mm] | ±110.0 |
| Polygon mirror Maximum scanning angle | θmax [deg] | 39.4 |
| From Polygon mirror to Natural convergent point | fc [mm] | 414.5 |
| Natural convergent Main F number | Fno | 177.1 |

| First surface (Incident-side lens surface) | | Second surface (Emission-side lens surface) | |
|---|---|---|---|
| $a_{2,0}$ | -3.230416.E-02 | $a_{2,0}$ | -4.632615.E-02 |
| $a_{0,2}$ | 5.404792.E-03 | $a_{0,2}$ | 1.236455.E-03 |
| $a_{2,2}$ | 5.015871.E-05 | $a_{2,2}$ | 2.294436.E-05 |
| $a_{0,4}$ | -3.081470.E-06 | $a_{0,4}$ | -2.181857.E-06 |
| $a_{2,4}$ | -7.925122.E-08 | $a_{2,4}$ | -2.270360.E-08 |
| $a_{0,6}$ | 1.545893.E-09 | $a_{0,6}$ | 6.503557.E-10 |
| $a_{2,6}$ | 6.894860.E-11 | $a_{2,6}$ | 6.314848.E-12 |
| $a_{0,8}$ | -5.114629.E-13 | $a_{0,8}$ | -7.414789.E-14 |
| $a_{2,8}$ | -3.195494.E-14 | $a_{2,8}$ | 3.539055.E-15 |
| $a_{0,10}$ | 9.555232.E-17 | $a_{0,10}$ | -1.764976.E-17 |
| $a_{2,10}$ | 7.511501.E-18 | $a_{2,10}$ | -2.411179.E-18 |
| $a_{0,12}$ | -7.216909.E-21 | $a_{0,12}$ | 4.944695.E-21 |
| $a_{2,12}$ | -7.29691E-22 | $a_{2,12}$ | 3.61077E-22 |

| Lens shift amount | D1 [mm] | 0.58 |
|---|---|---|
| Lens tilt amount | β1 [deg] | 0.2 |
| Lens surface shift amount | D2 [mm] | 0.062 |
| Lens surface tilt amount | β2 [deg] | 0.39 |

CHANGE IN Fno. IN SUB-SCANNING DIRECTION

SCANNING OPTICAL APPARATUS

CROSS-REFERENCE TO RELATED APPLICATION(S)

This application claims priority from Japanese Patent Application No. 2010-082085 filed on Mar. 31, 2010, the disclosure of which is incorporated herein by reference in its entirety.

TECHNICAL FIELD

The present invention relates to a scanning optical apparatus suitable for use in an electrophotographic image forming apparatus.

BACKGROUND ART

There is known a multibeam scanning optical apparatus having a plurality of individually modulated light sources and capable of scanning a plurality of lines at the same time. In such a multibeam scanning optical apparatus, an attempt is made to design a lens form of an optical element such as an f-theta (fθ) lens in an appropriate manner so that the size of the f-theta lens can be reduced and high-definition printing is realized. In this scanning optical apparatus, a curvature of f-theta lens in a sub-scanning plane changes asymmetrically along a main scanning direction from a point on an optical axis toward both outer ends of the f-theta lens.

However, if a shape of each lens surface of the optical element is not symmetrical with respect to the sub-scanning plane passing through the optical axis, fabrication and inspection of the optical element become complicated.

In view of the above, it would be desirable to provide a scanning optical apparatus which can be easily fabricated by designing the shape of each lens surface of the optical element to be symmetrical in the main scanning direction with respect to the optical axis, while enabling high-definition exposure of a photoconductor to light.

SUMMARY OF THE INVENTION

According to the present invention, there is provided a scanning optical apparatus comprising: a plurality of individually modulated light sources; a first optical element configured to convert light emitted from each of the plurality of light sources into a beam of light; a second optical element configured to convert beams of light having passed through the first optical element into linear images extending in a main scanning direction; a polygon mirror configured to spin at high speed and to deflect the beams of light having passed through the second optical element in the main scanning direction; and a third optical element configured to convert the beams of light having been deflected by the polygon mirror into spot-like images and focus the spot-like images on a target surface to be scanned, wherein the third optical element has a pair of lens surfaces; wherein each lens surface of the third optical element is aspheric in a main scanning plane, a curvature thereof in a sub-scanning plane changes continuously and symmetrically along the main scanning direction from a point on an optical axis toward both outer ends of the lens surface, and a shape of the lens surface is symmetrical with respect to the sub-scanning plane passing through the optical axis; and wherein the third optical element is configured such that a first optical axis defined as an optical axis of an incident-side lens surface of the third optical element is inclined in the main scanning plane with respect to a normal line extending from a scanning center on the target surface and an intersection point between the first optical axis and the incident-side lens surface is shifted with respect to the normal line, and that a second optical axis defined as an optical axis of an emission-side lens surface is inclined in the main scanning plane with respect to the first optical axis and an intersection point between the second optical axis and the emission-side lens surface is shifted with respect to the first optical axis, so as to satisfy the following formula:

$$\text{Max}[P_{sub}(y)] - \text{Min}[P_{sub}(y)] < 0.1 * DP \quad (1)$$

where y is an image height on the target surface in the main scanning direction;
DP is a dot pitch on the target surface in the sub-scanning direction; and
$P_{sub}(y)$ is a pitch of adjacent images from the plurality of light sources formed on the target surface in the sub-scanning direction, if the image height is y.

BRIEF DESCRIPTION OF THE DRAWINGS

To better understand the claimed invention, and to show how the same may be carried into effect, reference will now be made, by way of example only, to the accompanying drawings, in which:

FIG. 5 is a table showing relations between coefficients expressing the shapes of lens surfaces according to Example 1 and characteristics;

FIG. 11 is a table showing relations between coefficients expressing the shapes of lens surfaces according to Example 2 and characteristics;

DESCRIPTION OF EMBODIMENTS

A detailed description will be given of illustrative embodiments of the present invention with reference to the accompanying drawings where necessary.

Figure 1:
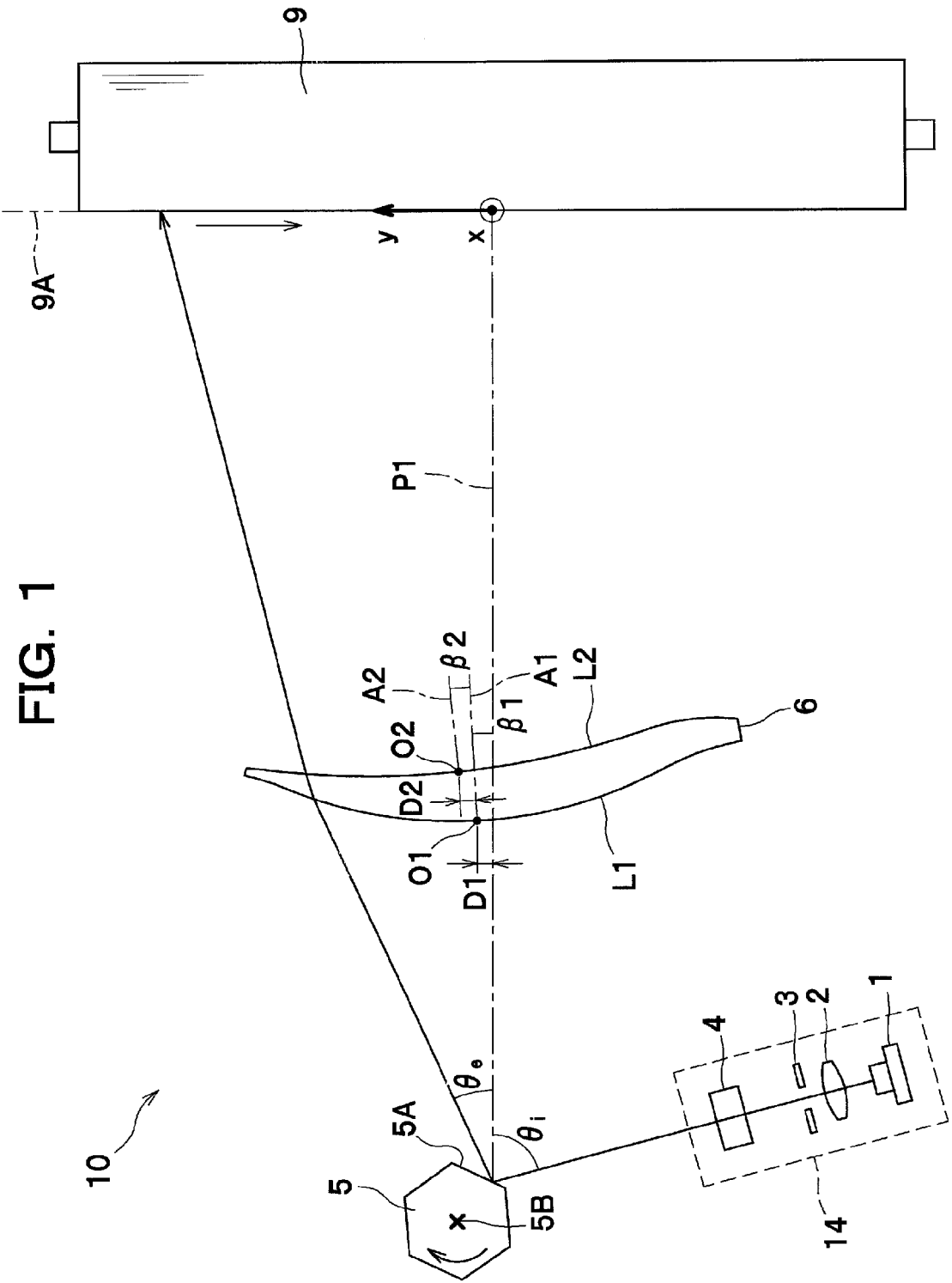
FIG. 1 is a sectional view of a scanning optical apparatus according one exemplary embodiment taken along a main scanning plane.

As seen in FIG. 1, a scanning optical apparatus 10 according to one exemplary embodiment includes an incident optical system 14, a polygon mirror 5 as an example of a deflecting mirror, and a f-theta lens (fθ lens) 6 as an example of a third optical element. With these components, a laser beam emitted from the incident optical system 14 is condensed and focused into a spot on a target surface 9A of a photoconductor drum 9, and rapidly sweeps the target surface 9A.

The incident optical system 14 includes a semiconductor laser 1, a collimating lens 2 as an example of a first optical element, an aperture sop 3, and a cylindrical lens 4 as an example of a second optical element.

Figure 2:
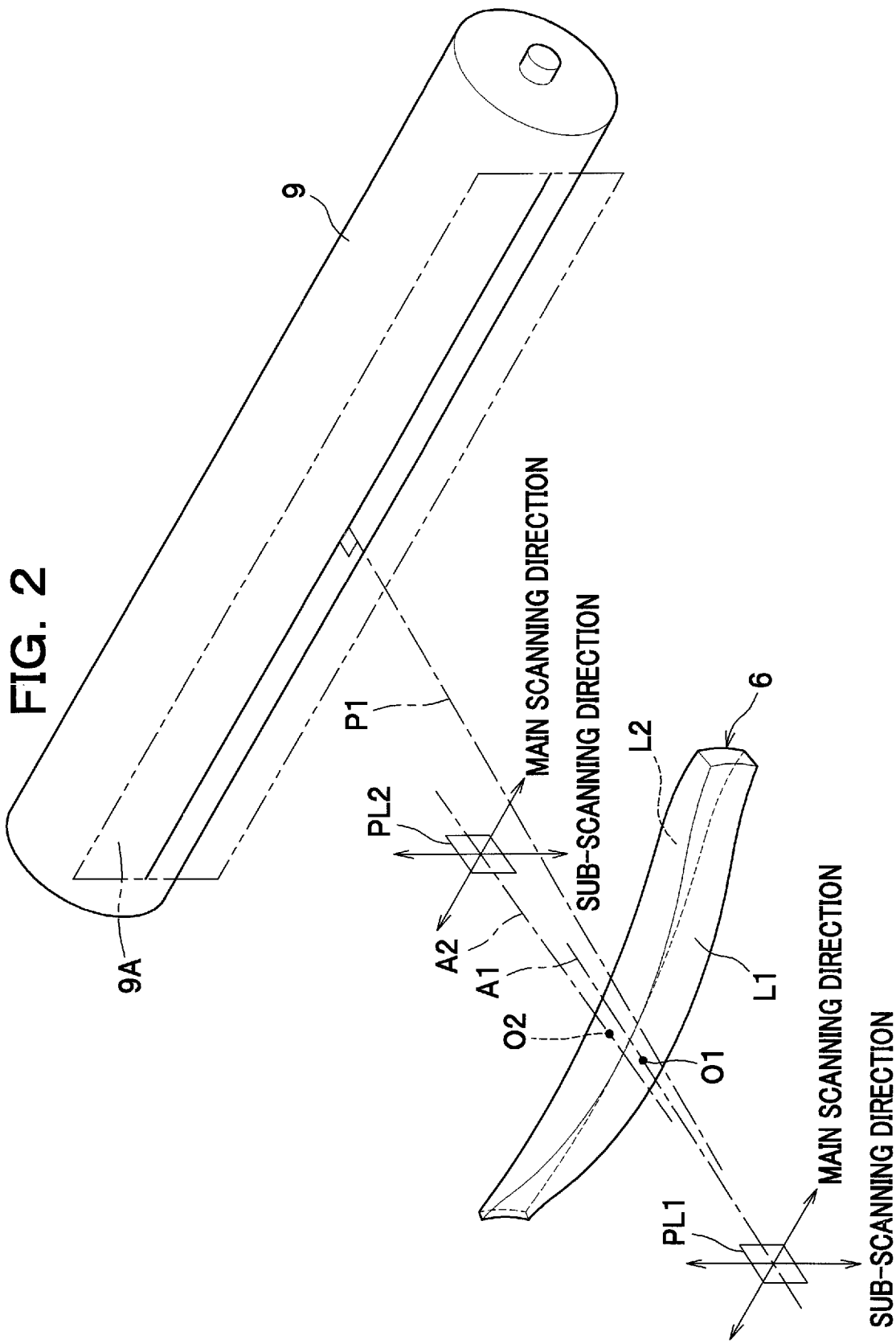
FIG. 2 is a perspective view explaining a main scanning direction and a sub-scanning direction with respect to lens surfaces.

The semiconductor laser 1 includes a plurality of light sources arranged in a sub-scanning direction (i.e., direction orthogonal to a main scanning direction, namely, the depth direction of FIG. 1. See also FIG. 2); in this exemplary embodiment, although not shown in the drawings, two light emitting elements are arranged, for example, in line. These two light emitting elements are individually modulated in accordance with images corresponding to two scanning lines.

The collimating lens 2 is a lens configured to convert a laser beam emitted from the semiconductor laser 1 into a beam of light. It is to be noted that the beam of light may include any of a parallel beam of light, a convergent beam of light, and a slightly divergent beam of light.

The aperture stop 3 is a member having an opening by which the diameter of the beam of light converted by the collimating lens 2 and passing through the opening is limited.

The cylindrical lens 4 is a lens configured to convert the beam of light having passed through the collimating lens 2 and the aperture stop 3 into a liner image extending in the main scanning direction and focus it on a mirror surface 5A of the polygon mirror 5.

The polygon mirror 5 has a plurality of mirror surfaces 5A disposed equidistantly from an axis of rotation 5B; the polygon mirror 5 shown in FIG. 1 has six mirror surfaces 5A. The polygon mirror 5 spins at a constant rotational speed around the axis of rotation 5B and reflects the beam of light having passed through the cylindrical lens 4 in the main scanning direction. The direction in which the beam of light is deflected by the polygon mirror 5 is defined as the main scanning direction.

The f-theta lens 6 is configured to convert the beam of light having reflected and thus deflected by the polygon mirror 5 into a spot-like image and focus it on the target surface 9A as well as to correct an optical face tangle error of the mirror surfaces 5A of the polygon mirror 5. The scanning optical apparatus 10 has only one f-theta lens 6. The f-theta lens 6 has f-theta characteristics so that the beam of light deflected at a constant angular velocity by the polygon mirror 5 is converted into a beam of light that scans the target surface 9A at a constant linear velocity. The f-theta lens 6 has a pair of opposite lens surfaces L1, L2, namely, an incident-side (polygon mirror 5 side) lens surface L1 and an emission-side (target surface 9A side) lens surface L2. These lens surfaces L1, L2 are aspheric in a main scanning plane and they are both tonic surfaces. Further, the curvature of each lens surface L1, L2 in a sub-scanning plane (i.e., section orthogonal to the main scanning direction) changes continuously and symmetrically within an effective region along the main scanning direction from a point on a first optical axis A1 or a point on a second optical axis A2 toward both outer ends of the lens surface L1, L2.

In this embodiment, the shape of the lens surface L1, L2 is not limited to a specific shape. For example, the shape of the lens surface can be expressed by a bivariate polynomial with respect to the main scanning direction (y) and the sub-scanning direction (x), such as given by the formula:

$$z_j = f(x, y) = \sum_m \sum_n (a_{m,n}) x^m y^n \tag{2}$$

where $a_{m,n}$ is a coefficient.

The shape of the lens surface L1 is symmetrical with respect to the sub-scanning plane PL1 (see FIG. 2) passing through the optical axis (i.e., first optical axis A1). The shape of the lens surface L2 is symmetrical with respect to the sub-scanning plane PL2 (see FIG. 2) passing through the optical axis (i.e., second optical axis A2). Therefore, the lens surfaces L1, L2 are easily manufactured. The lens surfaces L1, L2 can be manufactured, for example, by plastic injection molding or glass molding, using a mold having a reversed surface shape corresponding to the shapes of the lens surfaces L1, L2. In this instance, since the lens surface L1 is symmetrical with respect to the sub-scanning plane PL1 passing through the first optical axis A1 and the lens surface L2 is symmetrical with respect to the sub-scanning plane PL2 passing through the second optical axis A2, a correction is easily made during the manufacture of the mold and an inspection of the shape of the mold or the product can also be made with ease.

Figure 3:
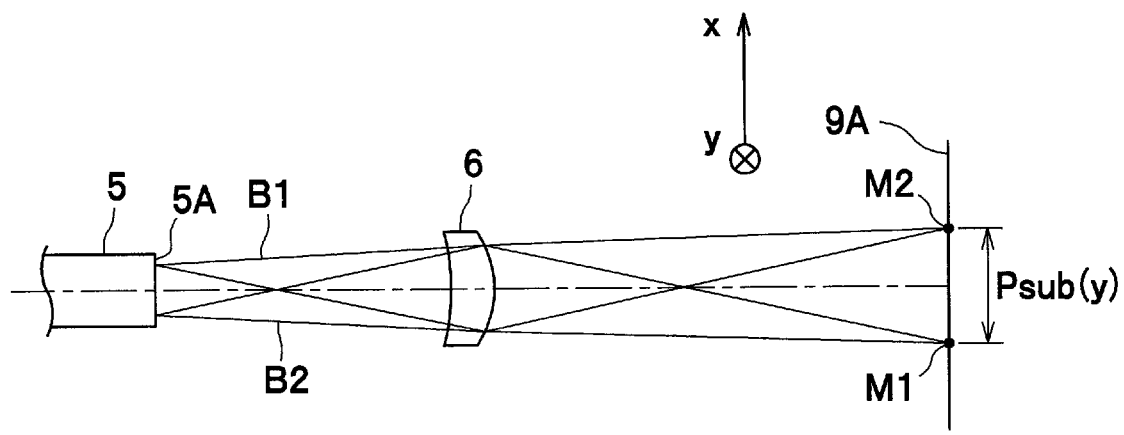
FIG. 3 is a sectional view taken along a sub-scanning plane, illustrating paths of light after being reflected by a polygon mirror.
Figure 4:
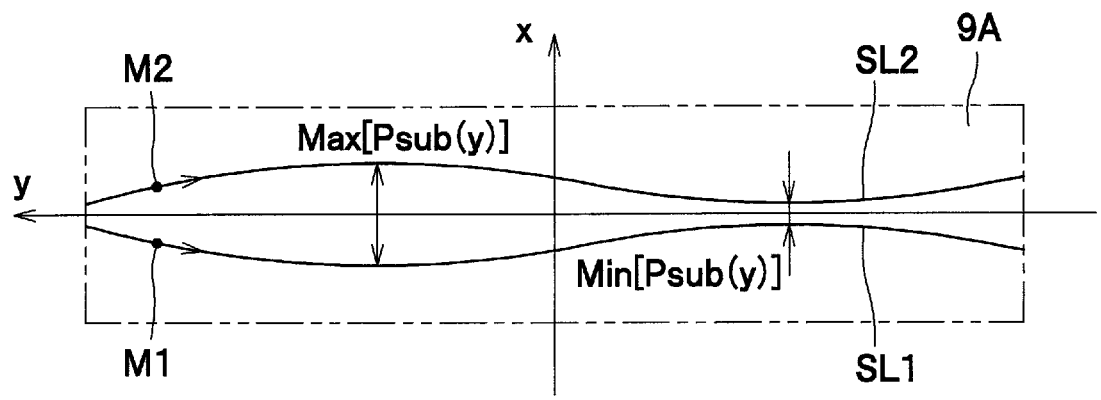
FIG. 4 is a view explaining unevenness of the pitch on a target surface between images formed by two light sources.

As best seen in FIG. 3, two beams of light B1, B2 incident onto the mirror surface 5A of the polygon mirror 5 in the form of two linear images extending in the main scanning direction are condensed by the f-theta lens 6 onto the target surface 9A to be scanned, so that spot-like images M1, M2 are formed on the target surface 9A. The scanning optical apparatus 10 rapidly sweeps with two spot-like images M1, M2 in the main scanning direction, so that as best seen in FIG. 4, two scanning lines SL1, SL2 are drawn at one time by a single scanning operation in the main scanning direction.

However, as best seen in FIG. 1, the distance from a reflecting point on the mirror surface 5A to the lens surface L1 and the distance from the lens surface L2 to the target surface 9A vary in accordance with an image height y on the target surface 9A (or emission angle $\theta_e$ of FIG. 1). For this reason, as best seen in FIG. 4, a pitch $P_{sub}(y)$ between the images M1, M2 varies to some extent during one scanning operation.

As far as the reflecting points of the beams of light B1, B2 on the mirror surface 5A are concerned, each of these reflecting points is not a fixed point and thus changes in accordance with the emission angle $\theta_e$ (see FIG. 1). Furthermore, even in the case of two symmetrical emission angles $\theta_e$ (e.g., 30 degrees and −30 degrees) with respect to a normal line P1 extending from a scanning center on the target surface 9A, the reflecting points are not positioned symmetrical to each other with respect to the normal line P1. Therefore, if the optical axis of each lens surface L1, L2 of the f-theta lens 6 is matched to the normal line P1, the distance from the mirror surface 5A of the polygon mirror 5 to the f-theta lens 6 is different, for instance, at the emission angle $\theta_e$ of 30 degrees and at the emission angle $\theta_e$ of −30 degrees. Accordingly, the distribution of the magnification by the f-theta lens 6 in the sub-scanning direction is not symmetrical with respect to the main scanning direction. By this asymmetry too, the pitch $P_{sub}(y)$ between the images M1, M2 varies during one scanning operation in the main scanning direction.

If a fluctuation of the pitch $P_{sub}(y)$ due to these factors is too great, distortion of the scanning image is observed. In order to obtain a high-definition image, it is necessary that if a dot pitch on the target surface 9A in the sub-scanning direction is DP, the maximum variation of the pitch $P_{sub}(y)$ should be smaller than 10% of DP. In other words, the following formula (1) should be satisfied.

$$\text{Max}[P_{sub}(y)] - \text{Min}[P_{sub}(y)] < 0.1 * DP \quad (1)$$

In this embodiment, for the purpose of better understanding, the number of light emitting elements (i.e., light sources) provided in the semiconductor laser 1 is two. However, if the semiconductor laser has three or more light sources, the above formula (1) should be satisfied between all the images formed by adjacent light sources.

According to this embodiment, in order to satisfy the formula (1), the arrangement of the incident optical system 14, the polygon mirror 5, and the target surface 9A, the arrangement of the f-theta lens 6 relative thereto, and the shape of the f-theta lens 6 are adjusted in the scanning optical apparatus 10. In this embodiment, as best seen in FIG. 1, the first optical axis A1 defined as the optical axis of the lens surface L1 is inclined by angle β1 with respect to the normal line P1 extending from the scanning center on the target surface 9A, and the center of the lens surface L1 (i.e., intersection point O1 between the first optical axis A1 and the lens surface L1) is shifted by the shift amount D1 with respect to the normal line P1. Further, the second optical axis A2 defined as the optical axis of the lens surface L2 is inclined by angle β2 with respect to the first optical axis A1, and the center of the lens surface L2 (i.e., intersection point O2 between the second optical axis A2 and the lens surface L2) is shifted by the shift amount D2 with respect to the first optical axis A1. Therefore, the distance from the mirror surface 5A of the polygon mirror 5 to the lens surface L1, the distance from the lens surface L1 to the lens surface L2, and the distance from the lens surface L2 to the target surface 9A can be adjusted. As a result, even if the lens surface L1 is symmetrical with respect to the sub-scanning plane PL1 passing through the first optical axis A1 and the lens surface L2 is symmetrical with respect to the sub-scanning plane PL2 passing through the second optical axis A2, the formula (1) can be satisfied. In other words, the f-theta lens 6 can be easily fabricated, while enabling a high-definition image exposure.

An example of the f-theta lens 6 and its arrangement for satisfying the above formula (1) will be described.

EXAMPLE 1

Description will be given of an example in which a pair of lens surfaces L1, L2 of the f-theta lens 6 are both toric surfaces. In the f-theta lens 6 of the scanning optical apparatus according to Example 1, the shapes of the lens surface L1 (i.e., incident-side lens surface) and the lens surface L2 (i.e., emission-side lens surface) in the main scanning direction and the sub-scanning direction are given by the following formula.

When the intersection point between each lens surface of the f-theta lens 6 and the optical axis is taken as an origin, the optical axis direction is taken as an z-axis, and an axis orthogonal to the optical axis in the main scanning plane is taken as a y-axis, the meridional direction corresponding to the main scanning direction is given by the following formula:

$$z = \frac{c_y y^2}{1 + \sqrt{1 - (1+k)c_y^2 y^2}} + A_4 y^4 + A_6 y^6 + A_8 y^8 + A_{10} y^{10} + A_{12} y^{12} \quad (3)$$

where $C_y$, k, $A_2$, ... $A_{12}$ are constants, and values at the incident-side lens surface and at the emission-side lens surface are shown in FIG. 5.

The sagittal direction corresponding to the sub-scanning direction can be given by the following formula:

$$s = \frac{x^2/r'}{1 + \sqrt{1 - (x/r')^2}} \quad (4)$$

Herein, if the radius of curvature in the sub-scanning plane passing through the optical axis is r, the radius of curvature r' in a sub-scanning plane at a point on the y coordinate of the lens surface is given by the following formula:

$$r' = r(1 + B_2 y^2 + B_4 y^4 + B_6 y^6 + B_8 y^8 + B_{10} y^{10} + B_{12} y^{12}) \quad (5)$$

where r, $B_2$, ... $B_{12}$ are constants, and values at the incident-side lens surface and at the emission-side lens surface are shown in FIG. 5.

Figure 6:
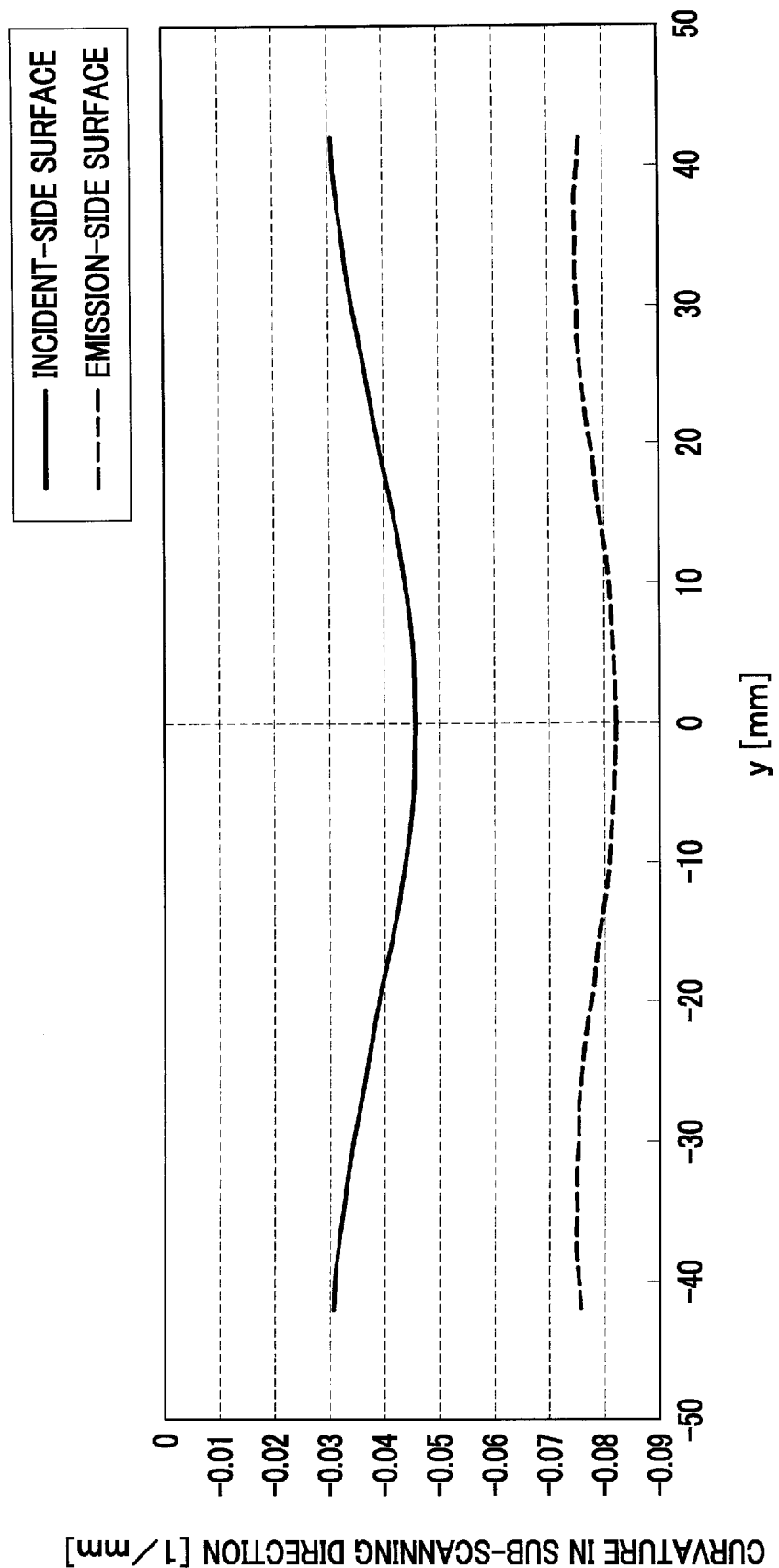
FIG. 6 is a graph showing curvature distribution of the lens surfaces according to Example 1 in the sub-scanning direction.

Change in the curvature in sub-scanning planes at a height (y) of the lens can be obtained by the formula (5) and this change is shown in FIG. 6. Namely, the curvature of each lens surface changes in various sub-scanning planes made by sectionally cutting the f-theta lens 6 along the main scanning direction. As seen in FIG. 6, the curvature of the lens in the sub-scanning plane changes continuously and symmetrically along the main scanning direction from the point on the optical axis toward both outer ends of the lens surface.

The f-theta lens 6 is configured such that the emission-side lens surface is shifted with respect to the incident-side lens surface by the shift amount D2 shown in FIG. 5 and is inclined at the tilt angle β2, and that the incident-side lens surface is shifted with respect to the normal line P1 by the shift amount D1 shown in FIG. 5 and is inclined at the tilt angle β1. Other arrangements and characteristics are shown in FIG. 5.

Figure 7:
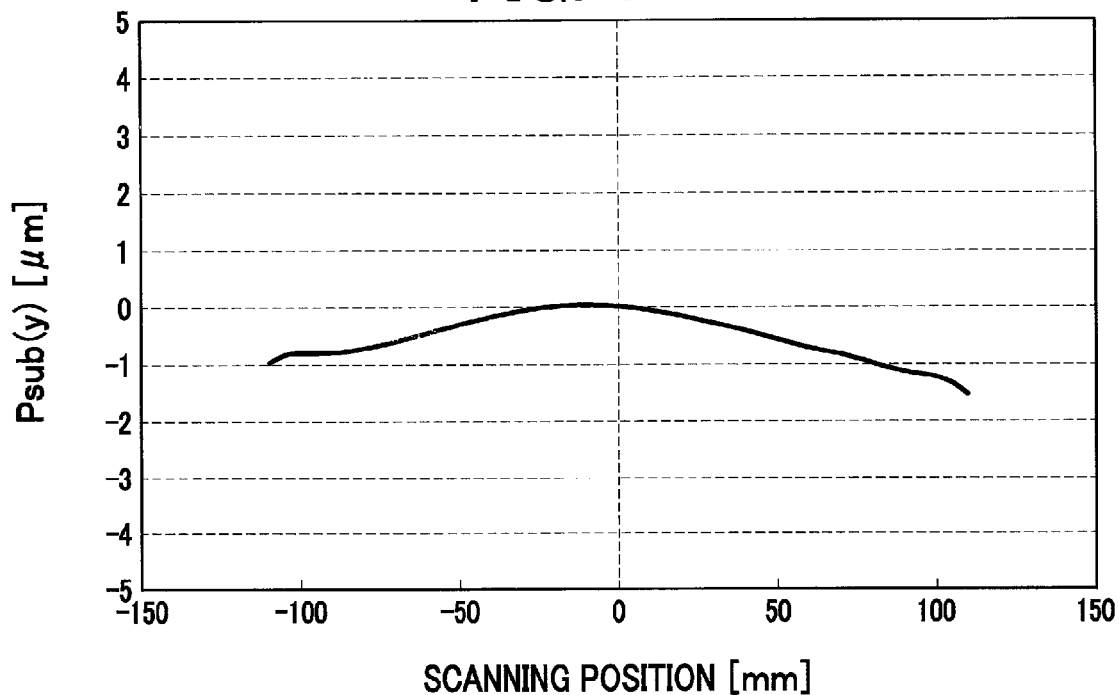
FIG. 7 is a graph showing a change in $P_{sub}(y)$ in accordance with scanning positions of Example 1.

According to the scanning optical apparatus of Example 1, if the dot pitch DP is obtained by 25400/600=42.3 μm, as best seen in FIG. 7, the pitch $P_{sub}(y)$ in the sub-scanning direction is 1.04 μm, namely 1.04<42.3/10. In other words, the formula (1) is satisfied.

Figure 8:
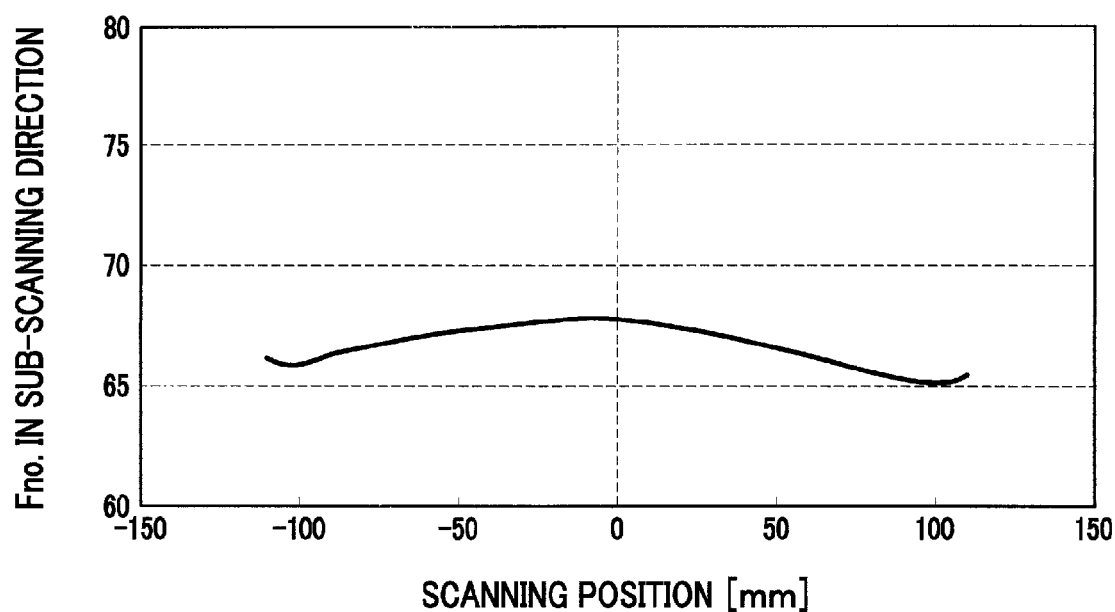
FIG. 8 is a graph showing a change in f-number in the sub-scanning direction in accordance with scanning positions of Example 1.

In this instance, change in f-number in the sub-scanning direction is shown in FIG. 8.

Figure 9:
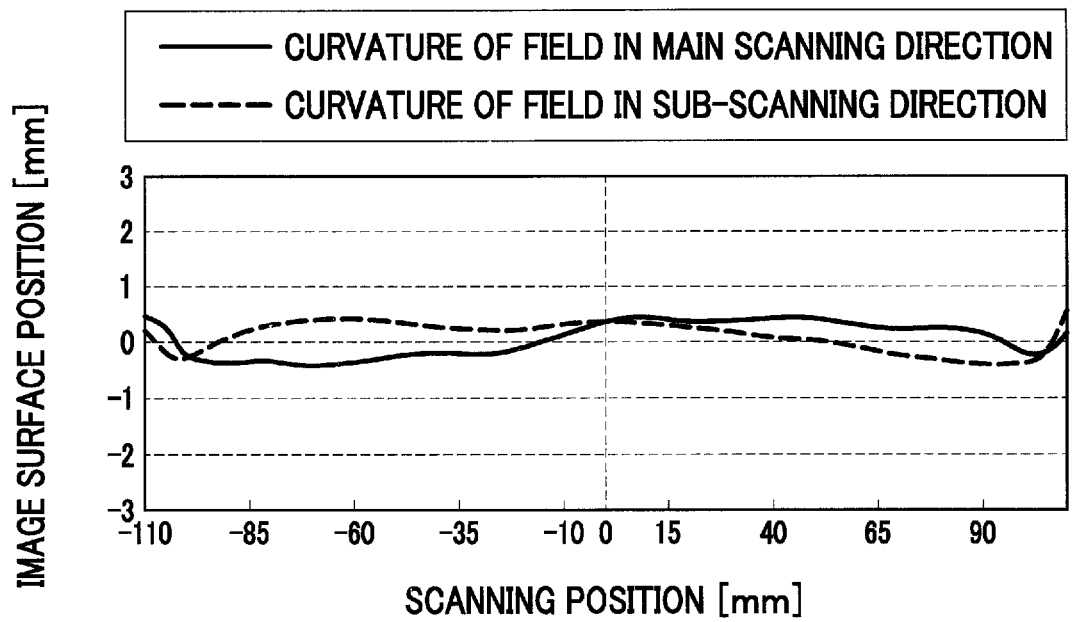
FIG. 9 is a graph showing curvatures of field according to Example 1.
Figure 10:
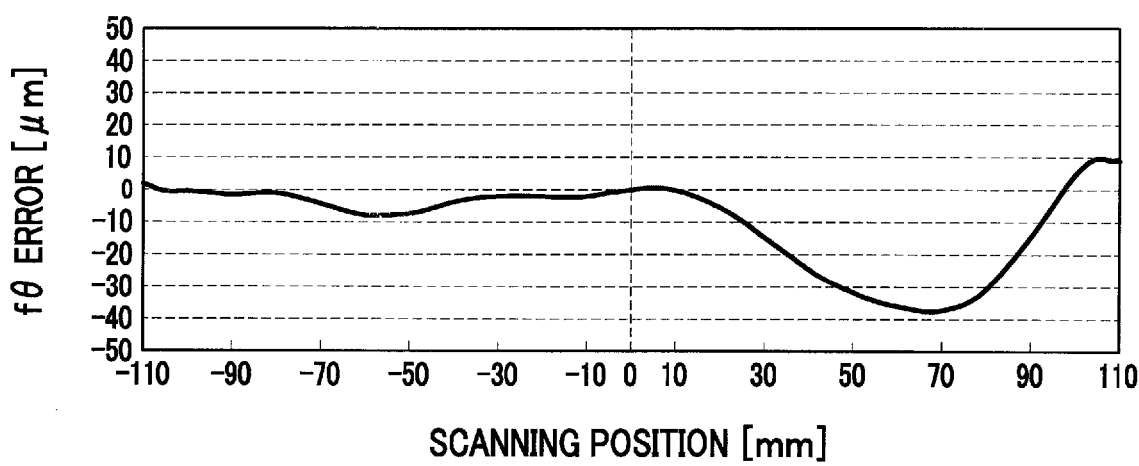
FIG. 10 is a graph showing f-theta error according to Example 1.

Further, curvatures of field in the scanning optical apparatus of Example 1 are shown in FIG. 9, which shows that the curvatures of field in the main scanning direction and the sub-scanning direction fall within the region less than ±1 mm and that the f-theta error (i.e., error obtained from an ideal image height that is calculated by y=kθ) also falls within the region less than 50 μm as shown in FIG. 10. Therefore, it is understood that a distortion of the image is reduced and a high-definition image exposure can be realized.

EXAMPLE 2

Description will be given of an example in which the f-theta lens 6 is expressed by the above formula (2). In the f-theta lens 6 of the scanning optical apparatus according to Example 2, the shapes of the lens surface L1 (i.e., incident-side lens surface) and the lens surface L2 (i.e., emission-side lens surface) are given by the following formula (6), when the intersection point between each lens surface of the f-theta lens 6 and the optical axis is taken as an origin, an axis orthogonal to the optical axis in the sub-scanning plane is taken as an x-axis, an axis orthogonal to the optical axis in the main scanning plane is taken as a y-axis, and the optical axis direction is taken as a z-axis:

$$z=(a_{2,0})x^2y^0+(a_{0,2})x^0y^2+(a_{2,2})x^2y^2+(a_{0,4})x^0y^4+(a_{2,4})x^2y^4+(a_{0,6})x^0y^6+(a_{2,6})x^2y^6+(a_{0,8})x^0y^8+(a_{2,8})x^2y^8+(a_{0,10})x^0y^{10}+(a_{2,10})x^2y^{10}+(a_{0,12})x^0y^{12}+(a_{2,12})x^2y^{12} \quad (6)$$

wherein $(a_{2,0}), \ldots (a_{2,12})$ are constants, and values at the incident-side lens surface and at the emission-side lens surface are shown in FIG. 11.

In the above formula (6), the curvature in the sub-scanning direction is determined by the term $x^2$ shown below.

$$z=(a_{2,0})x^2y^0+(a_{2,2})x^2y^2+(a_{2,4})x^2y^4+(a_{2,6})x^2y^6+(a_{2,8})x^2y^8+(a_{2,10})x^2y^{10}+(a_{2,12})x^2y^{12} \quad (7)$$

Figure 12:
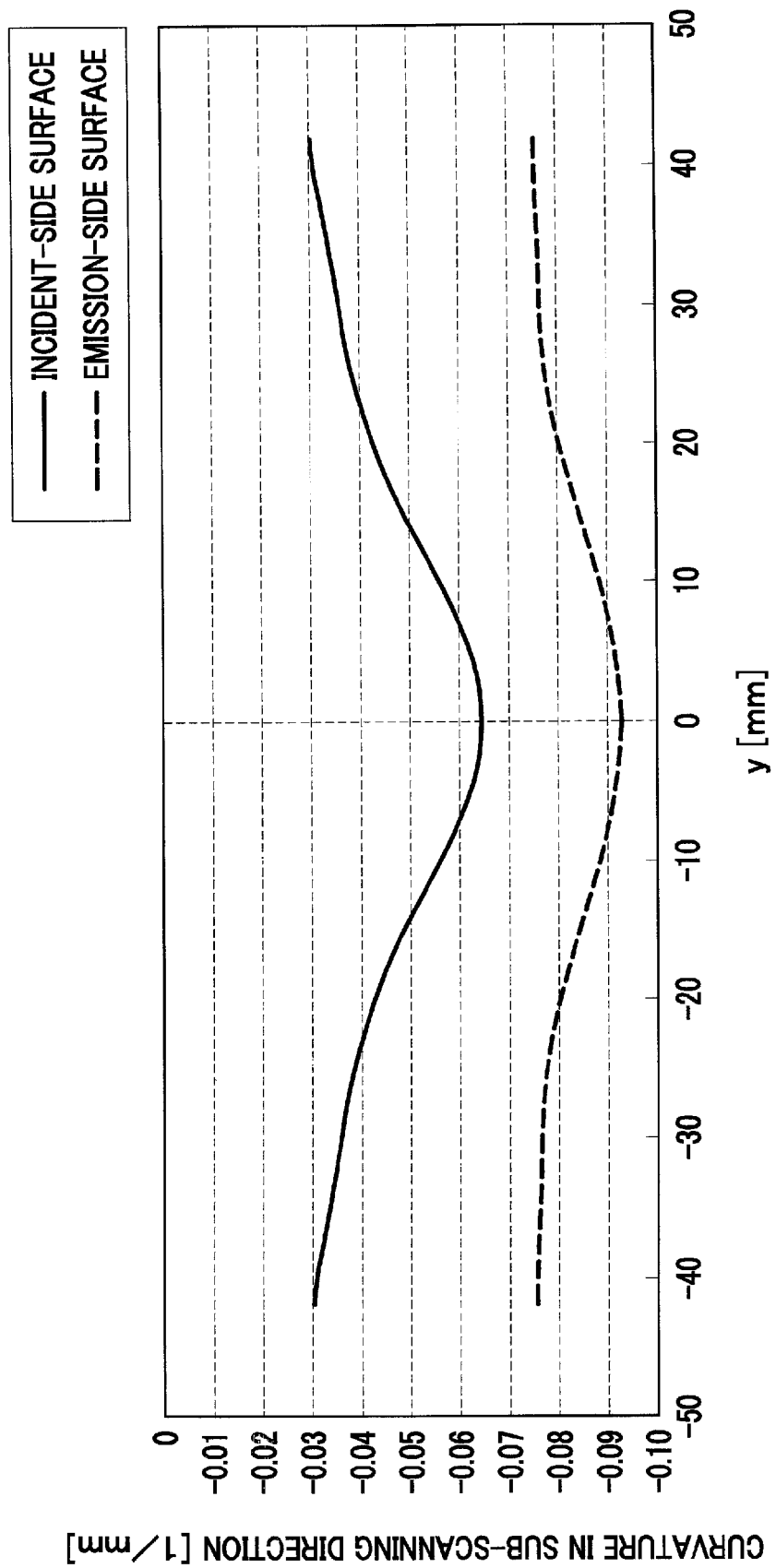
FIG. 12 is a graph showing curvature distribution of the lens surfaces according to Example 2 in the sub-scanning direction.

Distribution of the curvature in sub-scanning planes obtained by this formula is shown in FIG. 12. As seen in FIG. 12, the curvature of each lens surface changes continuously and symmetrically along the main scanning direction from the point on the optical axis toward both outer ends of the lens surface.

The f-theta lens 6 is configured such that the emission-side lens surface is shifted with respect to the incident-side lens surface by the shift amount D2 shown in FIG. 11 and is inclined at the tilt angle β2, and that the incident-side lens surface is shifted with respect to the normal line P1 by the shift amount D1 shown in FIG. 11 and is inclined at the tilt angle β1. Other arrangements and characteristics are shown in FIG. 11.

Figure 13:
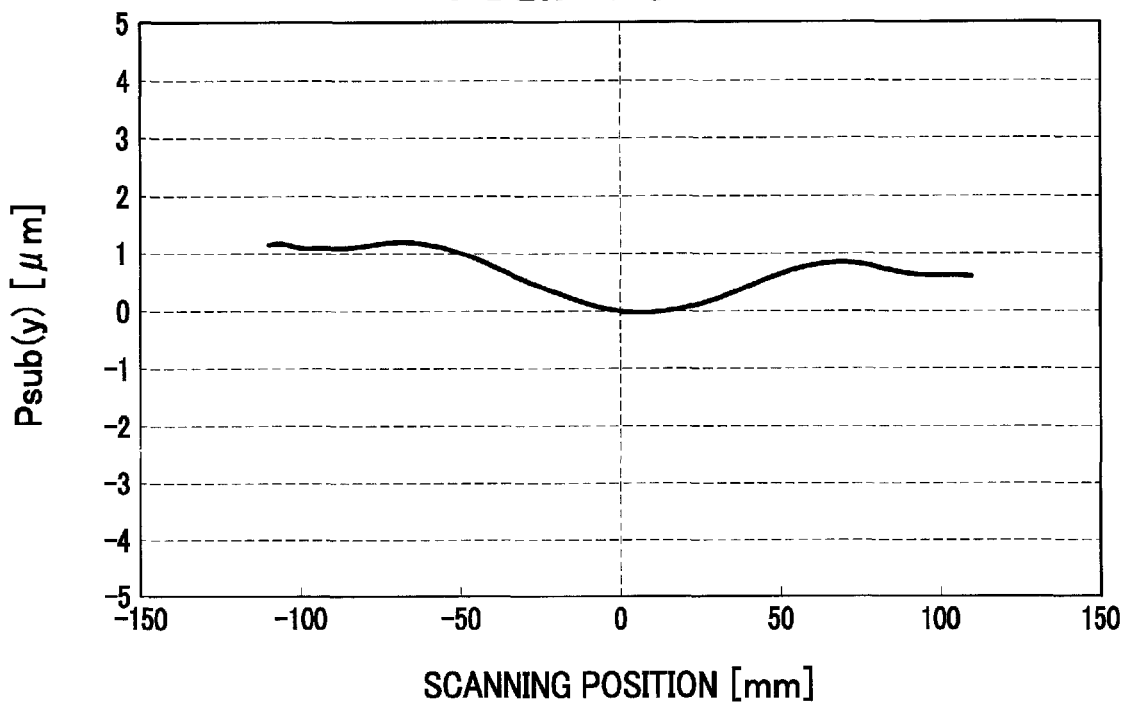
FIG. 13 is a graph showing a change in $P_{sub}(y)$ in accordance with scanning positions of Example 2.

According to the scanning optical apparatus of Example 2, if the dot pitch DP is obtained by 25400/600=42.3 μm, as best seen in FIG. 13, the pitch $P_{sub}(y)$ in the sub-scanning direction is 1.03 μm, namely 1.03<42.3/10. In other words, the formula (1) is satisfied.

Figure 14:
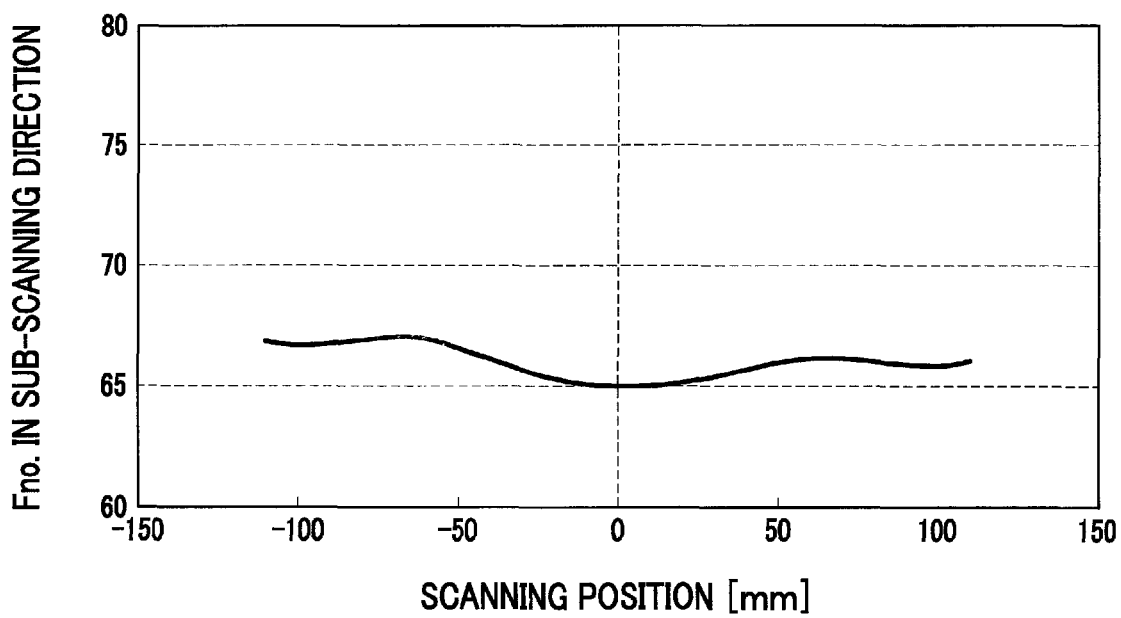
FIG. 14 is a graph showing a change in f-number in the sub-scanning direction in accordance with scanning positions of Example 2.

In this instance, change in f-number in the sub-scanning direction is shown in FIG. 14.

Figure 15:
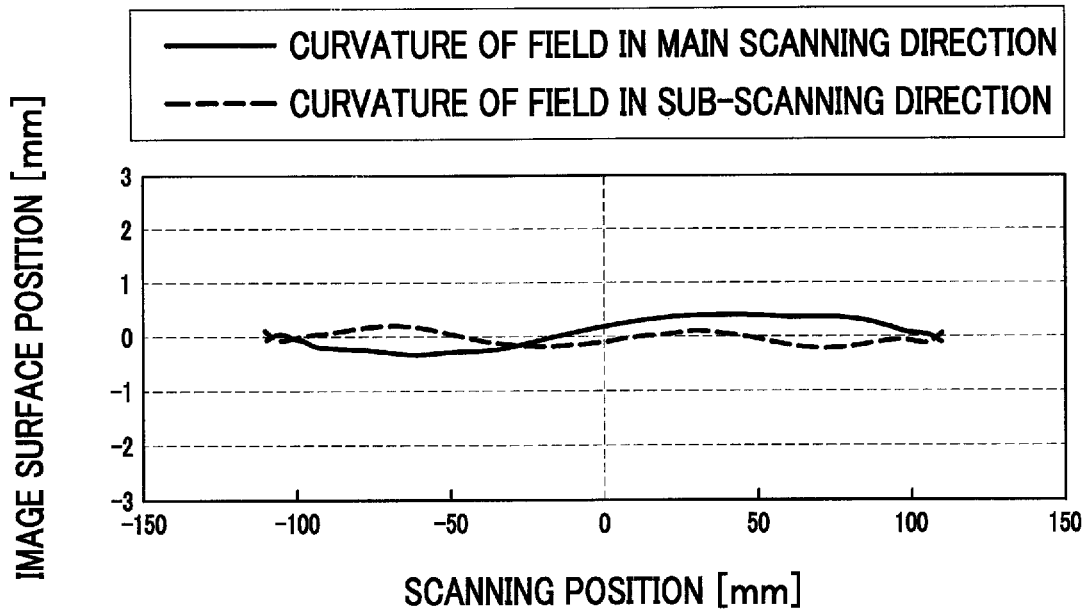
FIG. 15 is a graph showing curvatures of field according to Example 2.
Figure 16:
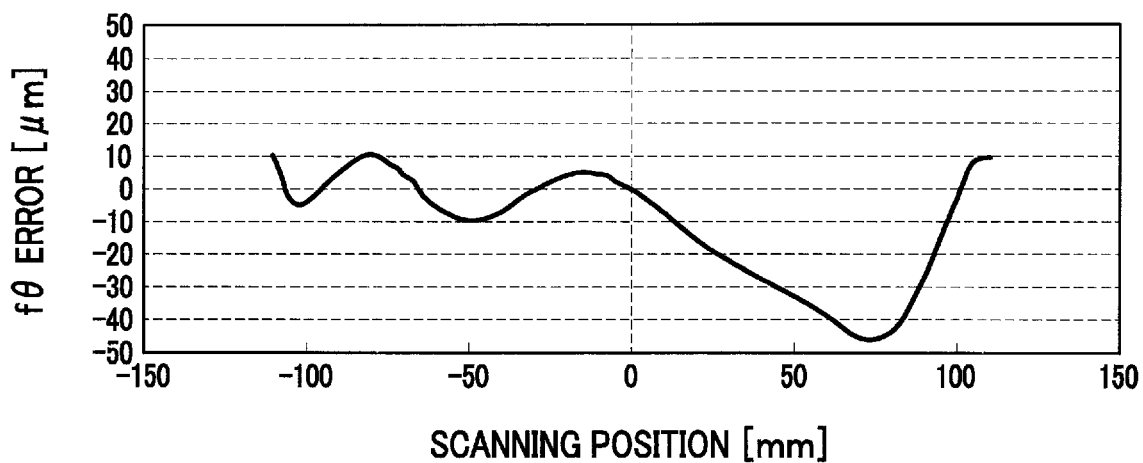
FIG. 16 is a graph showing f-theta error according to Example 2.

Further, curvatures of field in the scanning optical apparatus of Example 2 are shown in FIG. 15, which shows that the curvatures of field in the main scanning direction and the sub-scanning direction fall within the region less than ±1 mm and that the f-theta error (i.e., error obtained from the ideal image height that is calculated by y=kθ) also falls within the region less than 50 μm as shown in FIG. 16. Therefore, it is understood that a distortion of the image is reduced and a high-definition image exposure can be realized.

What is claimed is:

1. A scanning optical apparatus comprising:
   a plurality of individually modulated light sources;
   a first optical element configured to convert light emitted from each of the plurality of light sources into a beam of light;
   a second optical element configured to convert beams of light having passed through the first optical element into linear images extending in a main scanning direction;
   a polygon mirror configured to spin at high speed and to deflect the beams of light having passed through the second optical element in the main scanning direction; and
   a third optical element configured to convert the beams of light having been deflected by the polygon mirror into spot-like images and focus the spot-like images on a target surface to be scanned,
   wherein the third optical element has a pair of lens surfaces;
   wherein each lens surface of the third optical element is aspheric in a main scanning plane, a curvature thereof in a sub-scanning plane changes continuously and symmetrically along the main scanning direction from a point on an optical axis toward both outer ends of the lens surface, and a shape of the lens surface is symmetrical with respect to the sub-scanning plane passing through the optical axis; and
   wherein the third optical element is configured such that a first optical axis defined as an optical axis of an incident-side lens surface of the third optical element is inclined in the main scanning plane with respect to a normal line extending from a scanning center on the target surface and an intersection point between the first optical axis and the incident-side lens surface is shifted with respect to the normal line, and that a second optical axis defined as an optical axis of an emission-side lens surface is inclined in the main scanning plane with respect to the first optical axis and an intersection point between the second optical axis and the emission-side lens surface is shifted with respect to the first optical axis, so as to satisfy the following formula:

$$\text{Max}[P_{sub}(y)]-\text{Min}[P_{sub}(y)]<0.1*DP$$

where y is an image height on the target surface in the main scanning direction;
   DP is a dot pitch on the target surface in the sub-scanning direction; and
   $P_{sub}(y)$ is a pitch of adjacent images from the plurality of light sources formed on the target surface in the sub-scanning direction, if the image height is y.

2. The scanning optical apparatus according to claim 1, wherein each of the pair of lens surfaces of the third optical element is a toric surface.

3. The scanning optical apparatus according to claim 1, wherein each of the pair of lens surfaces of the third optical element has a shape defined by:

$$z_j = f(x, y) = \sum_m \sum_n (a_{m,n})x^m y^n$$

where $a_{m,n}$ is a coefficient.

* * * * *